(12) United States Patent
Breach

(10) Patent No.: US 8,912,256 B2
(45) Date of Patent: Dec. 16, 2014

(54) SWELLABLE MATERIAL USING SOY SPENT FLAKES

(75) Inventor: William David Breach, Kingwood, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 252 days.

(21) Appl. No.: 13/293,779

(22) Filed: Nov. 10, 2011

(65) Prior Publication Data

US 2013/0123394 A1    May 16, 2013

(51) Int. Cl.
| | | |
|---|---|---|
| C08K 5/00 | (2006.01) | |
| C08L 89/00 | (2006.01) | |
| C09J 189/00 | (2006.01) | |
| C09K 8/516 | (2006.01) | |
| C09K 8/514 | (2006.01) | |
| C09K 8/508 | (2006.01) | |
| E21B 33/12 | (2006.01) | |

(52) U.S. Cl.
CPC ............. *C09K 8/508* (2013.01); *C09K 8/516* (2013.01); *C09K 8/514* (2013.01); *E21B 33/1208* (2013.01)
USPC .......................................................... 524/25

(58) Field of Classification Search
USPC .......................................................... 524/25
See application file for complete search history.

(56) References Cited

U.S. PATENT DOCUMENTS

| | | | |
|---|---|---|---|
| 7,527,099 B2 | 5/2009 | Bosma et al. | |
| 7,645,818 B2 | 1/2010 | Jong | |
| 7,703,539 B2 | 4/2010 | Levy | |
| 2006/0094800 A1* | 5/2006 | Jong | 524/17 |
| 2008/0108733 A1 | 5/2008 | Colvin et al. | |
| 2009/0084550 A1 | 4/2009 | Korte et al. | |
| 2010/0147507 A1 | 6/2010 | Korte et al. | |
| 2010/0210770 A1 | 8/2010 | Nadeau et al. | |
| 2010/0326649 A1* | 12/2010 | Spacey et al. | 166/179 |
| 2011/0144261 A1 | 6/2011 | Flanigan et al. | |

FOREIGN PATENT DOCUMENTS

| | | |
|---|---|---|
| EP | 2025732 | 2/2009 |
| EP | 2071009 | 6/2009 |

OTHER PUBLICATIONS

Pervez, T., et al., "Effect of exposure on material response of a swelling elastomer," Archives of Materials Science and Engineering, vol. 37, Issue 2, Jun. 2009, pp. 77-84.
Jong, L., "Effect of soy spent flakes and carbon black co-filler in rubber composites," published by Elsevier Ltd., available online at www.sciencedirect.com, Composites: Part A 38 (2007) 252-264.
Jong, L., "Rubber composites reinforced by soy spent flakes," Published in 2005 by John Wiley & Sons, Ltd., Polym Int 0959-8103/2005/S30.00, Polymer International, Polym Int 54:172-1580 (2005) DOI: 10.1002/pi.1886.
McElfresh, Paul & Guo, Lillian (Baker Oil Tools), "Studies of water swellable NBR for downhole sealing applications," RubberWorld, vol. 239, No. 2, May 2008.
Davis, Tim & McCrady, Doug, "Swellable and Inflatable Packers Provide Annular Isolation in Multizone Horizontal Laterals," The American Oil & Gas Reporter, Dec. 2008.
Australian Examination Report for Australian Patent Application No. 2012244200, dated Mar. 22, 2013, 5 pages.
European Search Report for European Patent Application Np. EP12191993.0, dated Feb. 8, 2013, 9 pages.

\* cited by examiner

*Primary Examiner* — Angela C Scott
(74) *Attorney, Agent, or Firm* — Wong, Cabello, Lutsch, Rutherford & Brucculeri LLP

(57) ABSTRACT

A hybrid swellable material employs an oleophilic elastomer as a matrix admixed with an organic material derived from soy that is water swellable in brine, as well as fresh water. Various downhole tools may be made using this hybrid swellable material.

10 Claims, 5 Drawing Sheets

SWELLABLE MATERIAL USING SOY SPENT FLAKES

TECHNICAL FIELD

The present invention relates to the field of swellable elastomers, and in particular to a swellable elastomer that includes soy spent flakes.

BACKGROUND ART

In the fields of wellbore construction and intervention, swellable tools are used to provide isolation between two regions in an annulus formed between an exterior surface of a tubular and an interior surface of well casing or a wellbore. A swellable member is formed from an elastomeric material selected to swell when placed in certain fluids. Where the swellable member swells in oil, the member may comprise an oleophilic polymer such as ethylene propylene diene monomer rubber (EPDM). Where the swellable member swells in water, the member may comprise a polymer such as an N-vinylcarboxylic acid amide-base cross-linked resin and a water swellable urethane in an ethylene-propylene rubber matrix.

Hybrid swellable materials have been developed that swell in both oil and water. Such hybrid swellable materials typically use EPDM or other similar oil-swellable materials mixed with acrylate copolymers, commonly designated as super absorbent polymers (SAPs), that swell in water. Other types of swellable materials have been used, including various clays, salts, and other absorbents. Swellable materials are relatively recent in the oil and gas industry, and no industry standard exists.

However, SAP-based hybrid swellable materials have vastly different swell rates in fresh and salt water, because of the ionic nature of the SAP. The industry has desired a swellable material that will perform better in salt water conditions. In addition, SAPs have a tendency to extrude from the elastomer matrix, and a material that would reduce extrusion from the elastomer matrix would be desirable.

SUMMARY OF INVENTION

A hybrid swellable material employs an oleophilic elastomer as a matrix admixed with an organic material derived from soy that is water swellable in salt water, as well as fresh water. Various downhole tools may be made using this hybrid swellable material.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
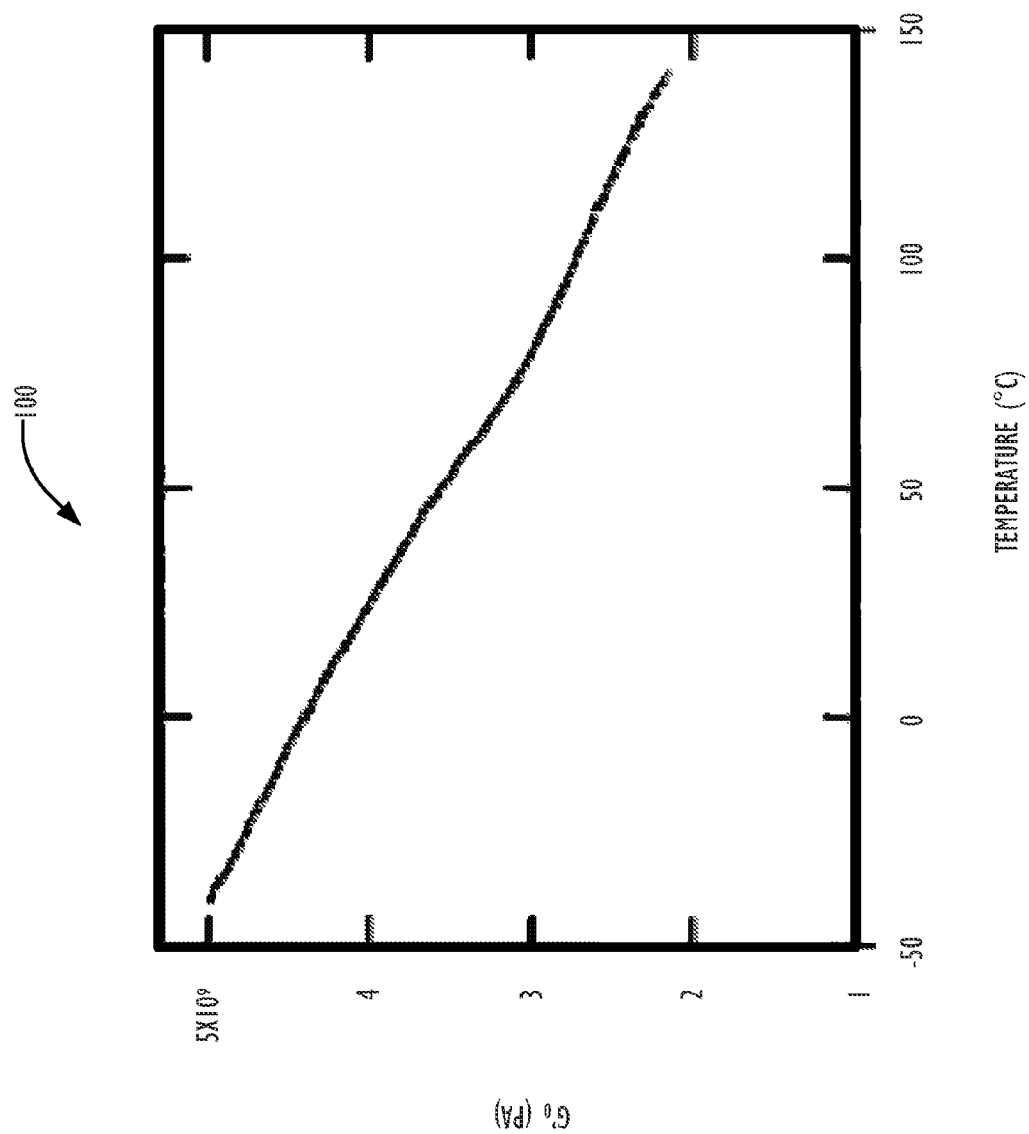
FIG. 1 is a graph illustrating elastic modulus of soy spent flakes at ambient temperatures.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

A new hybrid swelling rubber compound has been discovered that gives improved brine swelling volumes under the same conditions as compared with conventional compounds that use super absorbent polymers as a water-swellable component of a hybrid swellable compound. The rubber compound has been developed for use in downhole applications where the presence of brines would make conventional hybrid rubber compounds less useful because of the reduced swelling of SAPs.

The "base" polymer may be an oleophilic polymer such as EPDM. Although EPDM swells in oil, EPDM does not swell significantly in water. Therefore, hybrid swellable elastomers for use in both oil and water fluid environments have conventionally used SAPs mixed into a matrix of EPDM to provide water swellability. However, as explained above, SAPs do not swell nearly as much in brine as they do in fresh water. Indeed, additive salts such as sodium formate have been added to SAPs to try to overcome swelling problems in calcium chloride ($CaCl_2$) solutions commonly found in wells.

By replacing SAPs with an easily available industrial waste material, soy spent flakes (SSF), a hybrid compound may be produced that swells in both oil and brine, and which does not exhibit the same reduction in the amount of swelling in brines as SAPs. Unlike SAPs, SSF is non-ionic and is not affected by divalent ions.

SSF is a residual material left from processing soy beans, and is a renewable resource with no general market. SSF is mostly a soy carbohydrate fraction in soybean. Soybean can be processed into soybean oil and defatted soy flour. SSF is mostly an insoluble carbohydrate after most of soy protein and soy whey, a soluble carbohydrate, are removed from defatted soy flour. SSF is a by-product or residue in the commercial extraction process of soy protein isolate. It is an abundant and inexpensive renewable material, but it has little commercial value at this time. One source of SSF is the Archer Daniels Midland Company, but other sources of SSF exist and may be used. In addition, SSF may be made from defatted soy flour, which is commercially available from multiple sources, including Archer Daniels Midland Company.

The composition of SSF is generally considered to be approximately 12% cellulose, 17% pectin, 14% protein, and 53% insoluble polysaccharide, although those percentages may vary. SSF is desirable to be used in the as-is form from the commercial process without further separation so that its cost is comparable to inorganic fillers. SSF has the lowest cost among soy products such as defatted soy flour, soy protein concentrate, and soy proteins isolate (SPI), whereas SPI has the highest cost. Dry SSF is a rigid material and has a shear elastic modulus of ~4 GPa under ambient conditions as illustrated in the graph 100 of FIG. 1.

Although designated a "spent flake," SSF is typically available in granular form. In one embodiment, the SSF is further ground to a powder form before admixing with the rubber matrix.

SSF does not swell with a volume of expansion as high in fresh water as does SAP, with SSF expansion amounts typically in the range of 20%-40%, compared to a typical 800% expansion of SAP. In brine containing salts such as sodium chloride (NaCl), the SAP swell drops to approximately 300%. In brine containing salts such as calcium chloride ($CaCl_2$), SAP only swells about 2-3%. SSF swells with a volume of expansion of the same order of magnitude in fresh water, brine with $CaCl_2$, and brine with NaCl. Thus, in brine containing salts such as $CaCl_2$, SSF swells significantly more than SAP.

SSF can be used as a replacement for SAP in a standard mixing process with the base rubber. As with SAP rubber compounds, commonly known curing agents may be added to the mixture. The SSF does not appear to have any effect on the curing time of the rubber compound when compared to a rubber compound containing SAPs. Unlike some salts that have been used for water absorbency, SSF does not affect the vulcanization of the rubber compound, and do not dissolve out of the rubber, but act as an absorbent. Unlike SAPs, SSF when mixed into rubber compound matrices sticks to the rubber matrix and does not extrude easily.

Figure 2:
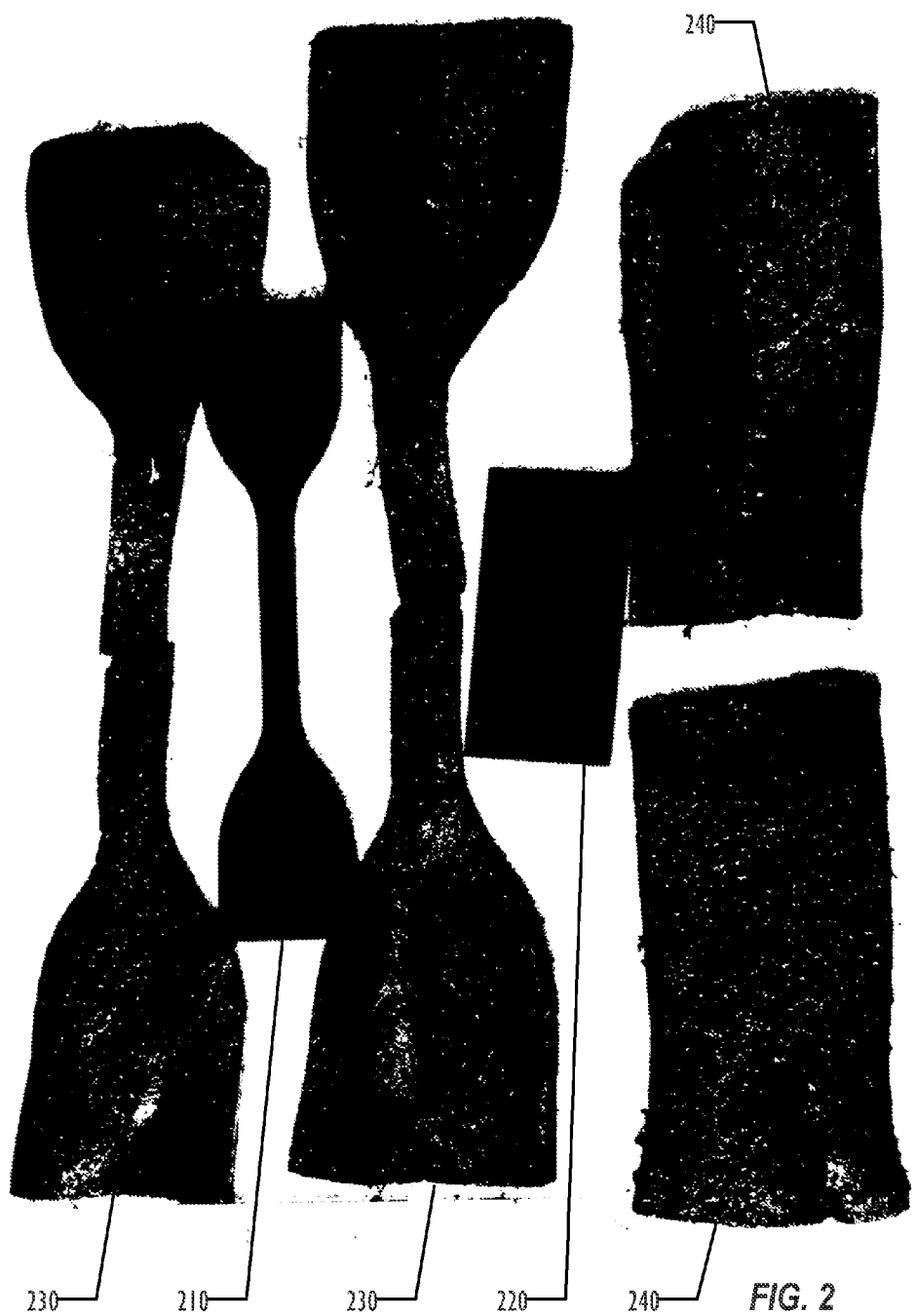
FIG. 2 is a photograph illustrating samples of a swellable elastomer in an original state and in a swollen state responsive to contact with oil according to one embodiment.

FIG. 2 is a photograph illustrating test samples of a rubber compound containing EPDM and SSF instead of SAPs. Samples 210 and 220 are original sized samples prior to exposure to oil. Samples 230 and 240 are samples of the rubber compound originally identical to samples 210 and 220, after exposure to oil, illustrating the amount of volume swell produced by the SSF and EPDM, both of which swell in oil.

In one embodiment, a rubber compound may be formed by mixing both SSF and SAP into the oleophilic base rubber, producing a compound that has the swelling capacity of a conventional hybrid swellable elastomer in fresh water, but which continues to swell in brines because of the SSF.

Although described above in terms of an additive to an oleophilic rubber such as EPDM to produce a hybrid rubber compound, SSFs are both oleoscopic and hygroscopic. Conventional swellable elastomers for use in water-based fluids typically use a rubber compound based upon an acrylonitrile butadiene rubber (NBR), which has been compounded with hygroscopic polymers, such as SAPs. In one embodiment, a hybrid swellable elastomer may be compounded from an NBR-based rubber compound into which is mixed SSF, either with or without SAPs or other hygroscopic polymers. The NBR-based rubber compound may include any type of NBR, including carboxylated NBR and hydrogenated NBR.

Figure 3:
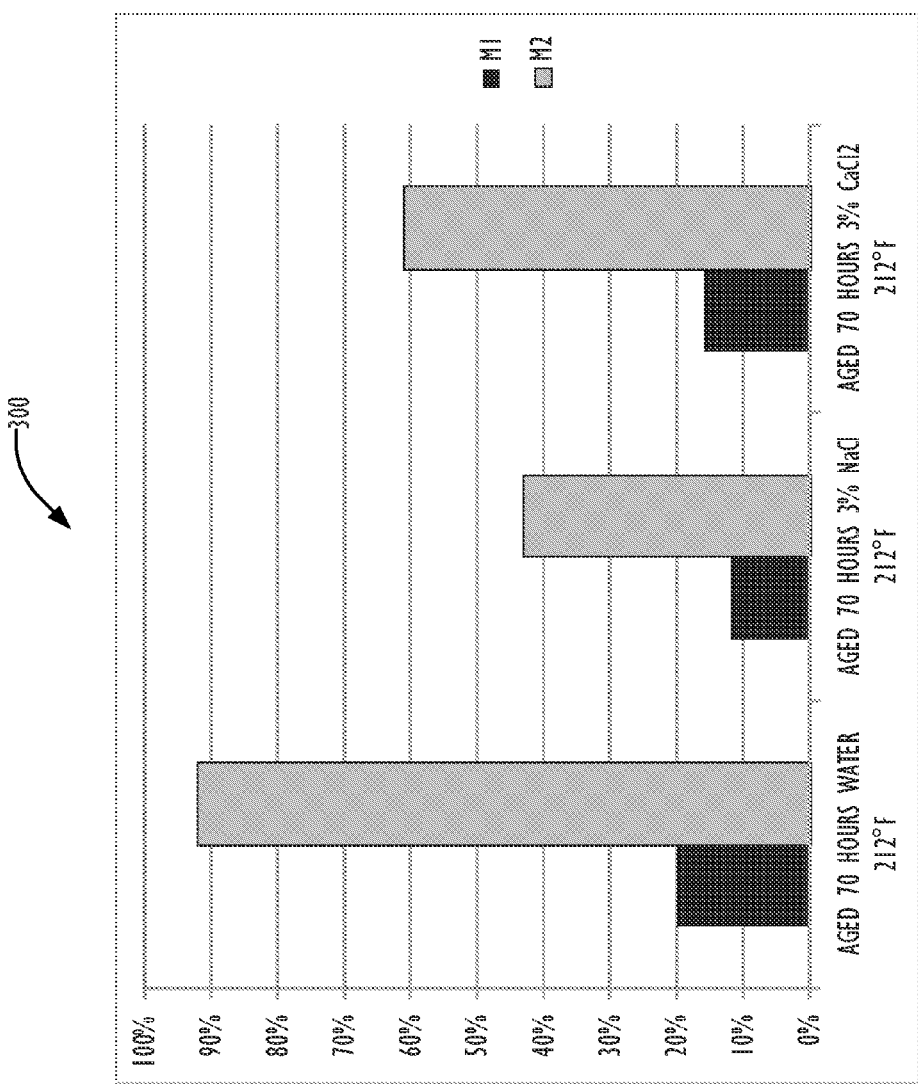
FIG. 3 is a graph illustrating swellability of a swellable elastomer according to two embodiments.

Other common rubber additives such as carbon black may also be added to the swellable elastomer for reinforcement of the rubber or to provide other desirable properties. In another example, sodium formate salts may also be added to the compound to help draw water into the rubber compound to enhance swelling. As illustrated in the graph 300 of FIG. 3, in which material M1 is a rubber compound with EPDM and SSF, while material M2 is a rubber compound with EPDM, SSF, and sodium formate (HCOONa), adding HCOONa to the rubber compound increases volume expansion in both fresh and salt water significantly. As with conventional SAP-containing rubber compounds, other common rubber additives such as anti-oxidants, plasticizers, curing agents and accelerators, and vulcanization accelerators may be added as desired.

In one embodiment, the SSF may be compounded with EPDM in a mixture comprising about 100 phr EPDM and about 60 phr SSF, in addition to conventional plasticizing, curing, and vulcanization additives. In a further embodiment, carbon black may be added at about 60 phr. In a further embodiment in which HCOONa is added to the compound, about 10 phr HCOONa may be used. These proportions are illustrative and by way of example only, and other proportions may be used.

In one embodiment, the SSF may be compounded with NBR in a mixture comprising about 100 phr NBR and about 60 phr SSF, in addition to conventional plasticizing, curing, and vulcanization additives. In a further embodiment, carbon black may be added at about 60 phr. In a further embodiment in which HCOONa is added to the compound, about 10 phr HCOONa may be used. These proportions are illustrative and by way of example only, and other proportions may be used. Various embodiments may use hydrogenated NBR (HNBR) or carboxlyated NBR (XNBR) instead of regular NBR as desired to provide improved heat resistance and improved mechanical properties (HNBR) or improved tear and abrasion resistance (XNBR).

Figure 4:
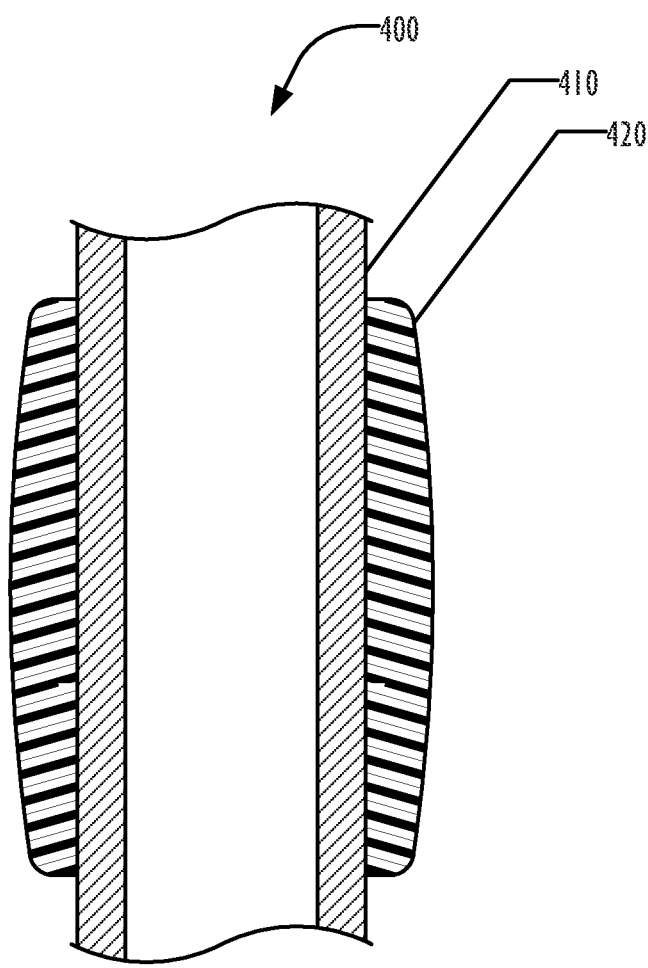
FIG. 4 is an elevation view illustrating a downhole tool employing a swellable elastomer according to one embodiment.
Figure 5:
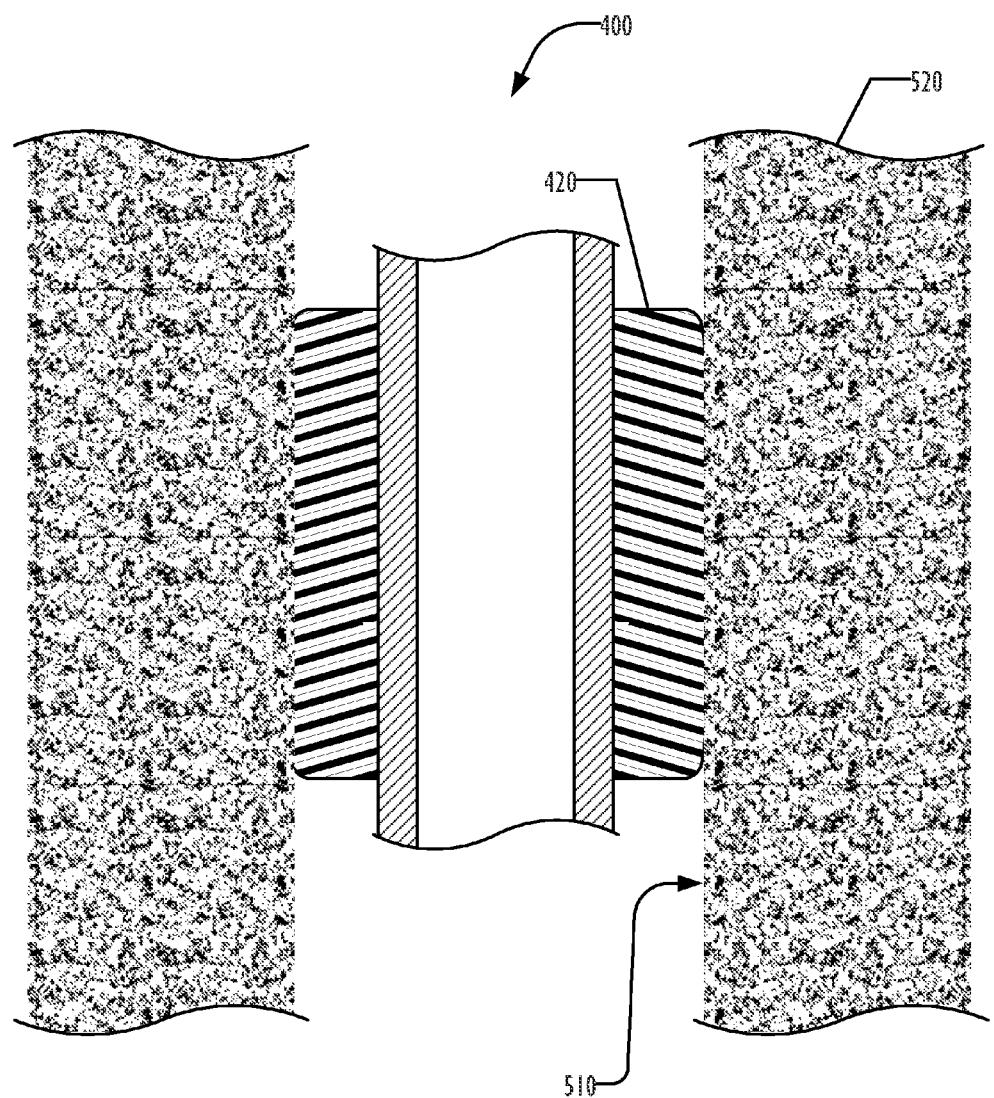
FIG. 5 is an elevation view illustrating the downhole tool of FIG. 4 as deployed in a formation.

An example of using the hybrid swellable elastomers described herein on a downhole tool 400, in this example a packer, is schematically illustrated in FIGS. 4 and 5, where the downhole tool 400 has a central support body or mandrel 410, about which a mantle of the swellable elastomer is disposed to form a sealing element 420. The sealing element 420 has a first or initial size as seen in FIG. 4. The shape of the sealing element 420 is illustrative and by way of example only, and the sealing element 420 may have other shapes and configurations for disposing the sealing element 420 on the downhole tool 400, and other elements not shown in FIG. 4 may be included in the downhole tool 400 as desired.

During run-in of the tool into the wellbore, the sealing element 420 is in its first or initial state which will allow it to be put into the correct place easily. After contact with water or brine, the deployed sealing element will expand or swell to a second shape and volume, which conforms to the wellbore walls 510 of the subterranean formation 520, as illustrated in FIG. 5, where the sealing element 420 has a volume greater than the volume illustrated in FIG. 4, and seals the wellbore. The water or brine that causes the sealing element 420 to expand outward may come from the subterranean formation or may be pumped downhole from the surface, as desired or needed.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. An elastomer comprising:
   a base polymer;
   about 10 phr sodium formate;
   soy spent flakes; and
   a curative,
   wherein the elastomer is swellable responsive to contact with brine.

2. The elastomer of claim 1, wherein the elastomer comprises a hybrid swellable elastomer, swellable in oil, brine, and a mixture of oil and brine.

3. The elastomer of claim 1, wherein the base polymer comprises ethylene propylene diene monomer rubber.

4. The elastomer of claim 1, wherein the base polymer comprises acrylonitrile butadiene rubber.

5. The elastomer of claim 1, wherein the base polymer comprises hydrogenated acrylonitrile butadiene rubber.

6. The elastomer of claim 1, wherein the base polymer comprises carboxylated acrylonitrile butadiene rubber.

7. The elastomer of claim 1, wherein the elastomer comprises:
   about 100 phr base polymer; and
   about 60 phr soy spent flakes.

8. The elastomer of claim 7, wherein the elastomer further comprises:
   about 50 phr carbon black.

9. The elastomer of claim 7, wherein the elastomer further comprises:
   a plasticizer.

10. The elastomer of claim 1, wherein the elastomer further comprises:
    a super absorbent polymer.

* * * * *